United States Patent
Yamashita

(10) Patent No.: US 8,212,902 B2
(45) Date of Patent: Jul. 3, 2012

(54) IMAGE PICKUP APPARATUS

(75) Inventor: Yuichiro Yamashita, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 12/575,331

(22) Filed: Oct. 7, 2009

(65) Prior Publication Data

US 2010/0091158 A1 Apr. 15, 2010

(30) Foreign Application Priority Data

Oct. 9, 2008 (JP) ................................ 2008-262999

(51) Int. Cl.
*H04N 5/335* (2011.01)
*H04N 5/235* (2006.01)

(52) U.S. Cl. ....................................... 348/296; 348/362

(58) Field of Classification Search .......... 348/296–297, 348/361–364
See application file for complete search history.

(56) References Cited

U.S. PATENT DOCUMENTS

| | | | | |
|---|---|---|---|---|
| 6,538,693 B1 * | 3/2003 | Kozuka | ............................ | 348/241 |
| 7,271,835 B2 * | 9/2007 | Iizuka et al. | ................. | 348/314 |
| 7,542,083 B2 * | 6/2009 | Kubo | ............................ | 348/248 |
| 7,973,835 B2 * | 7/2011 | Sakurai et al. | ................. | 348/241 |
| 8,085,321 B2 * | 12/2011 | Xu et al. | ........................ | 348/241 |
| 2001/0007471 A1 * | 7/2001 | Beiley | ............................ | 348/241 |
| 2008/0239129 A1 * | 10/2008 | Oshima et al. | ................. | 348/311 |
| 2008/0290382 A1 * | 11/2008 | Hirota | ............................ | 257/291 |

FOREIGN PATENT DOCUMENTS

JP 2006-246450 A 9/2006

\* cited by examiner

*Primary Examiner* — Trung Diep

(74) *Attorney, Agent, or Firm* — Canon USA, Inc. IP Division

(57) ABSTRACT

In an apparatus, operation is switchable between first and second modes. In the first mode, a photoelectric conversion part and a charge storage part are released from a reset state for all pixels included in an image acquisition area to start a period, and, when a predetermined time has elapsed, the photoelectric conversion part and an overflow drain region of each pixel are turned onto end the period, and finally the charge stored in the charge storage part is transferred to the amplifier part. In the second mode, after a mechanical shutter is opened to start a period, the mechanical shutter is closed to end the period, and stored charge is transferred to the amplifier part.

5 Claims, 12 Drawing Sheets

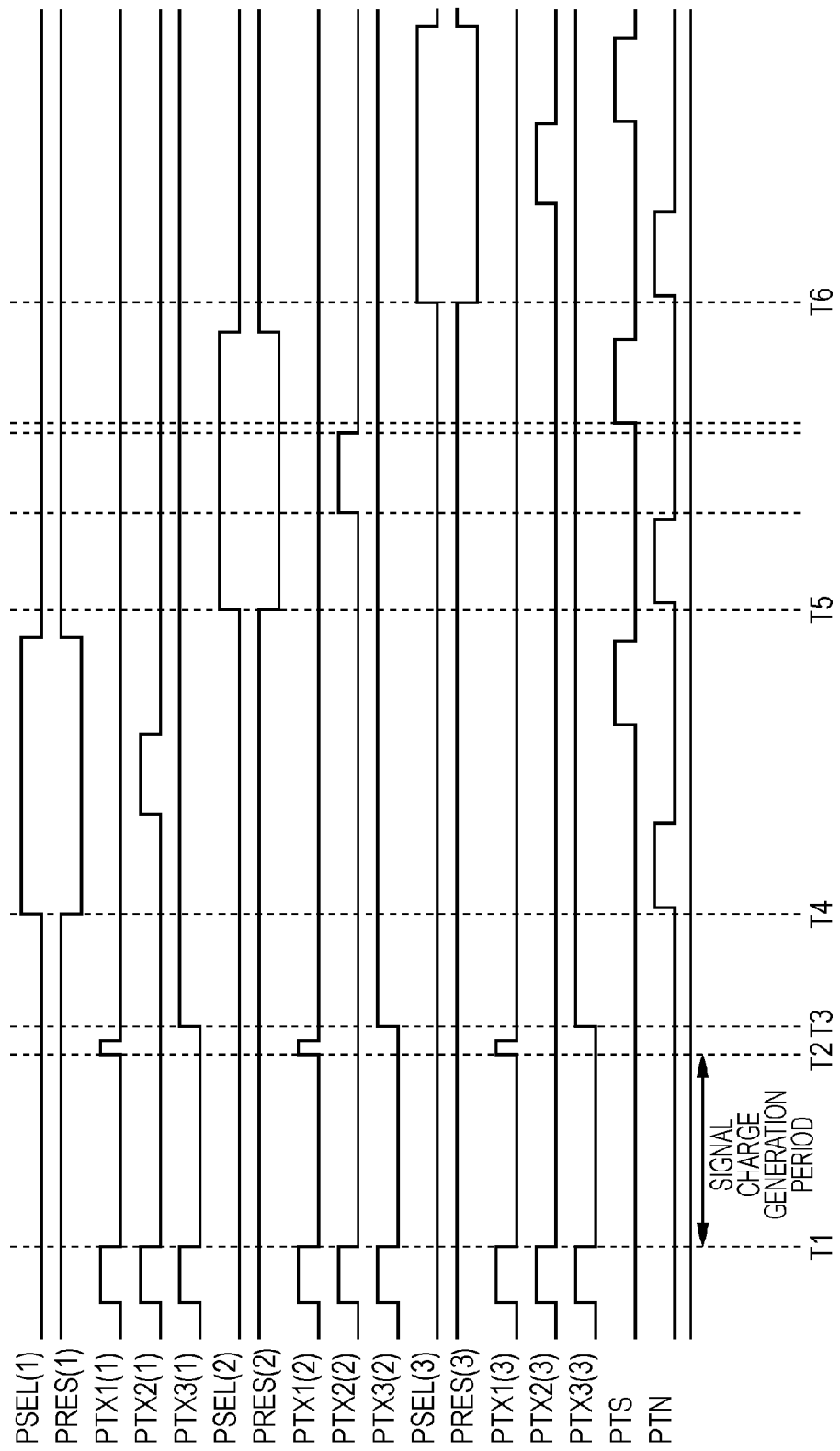

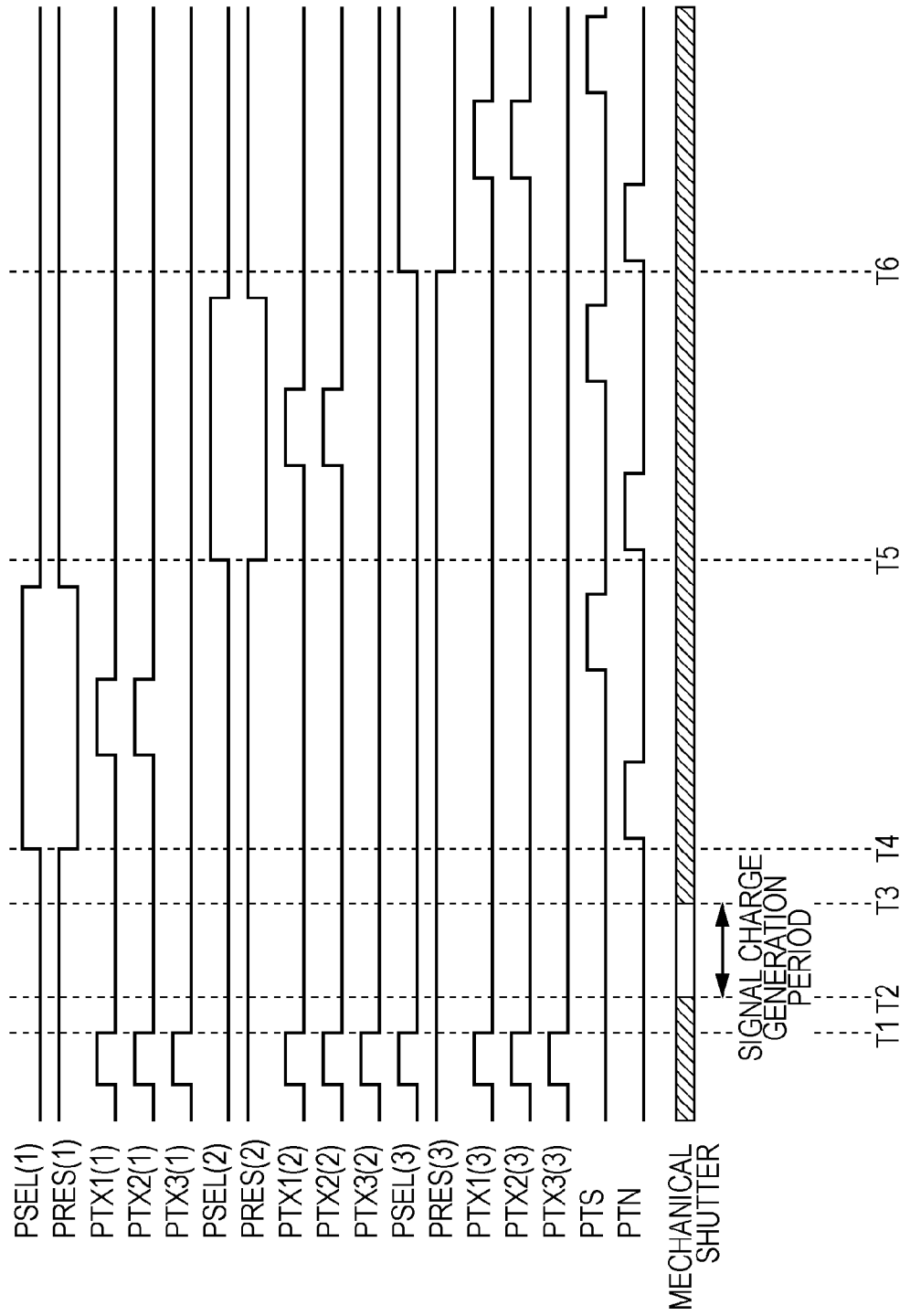

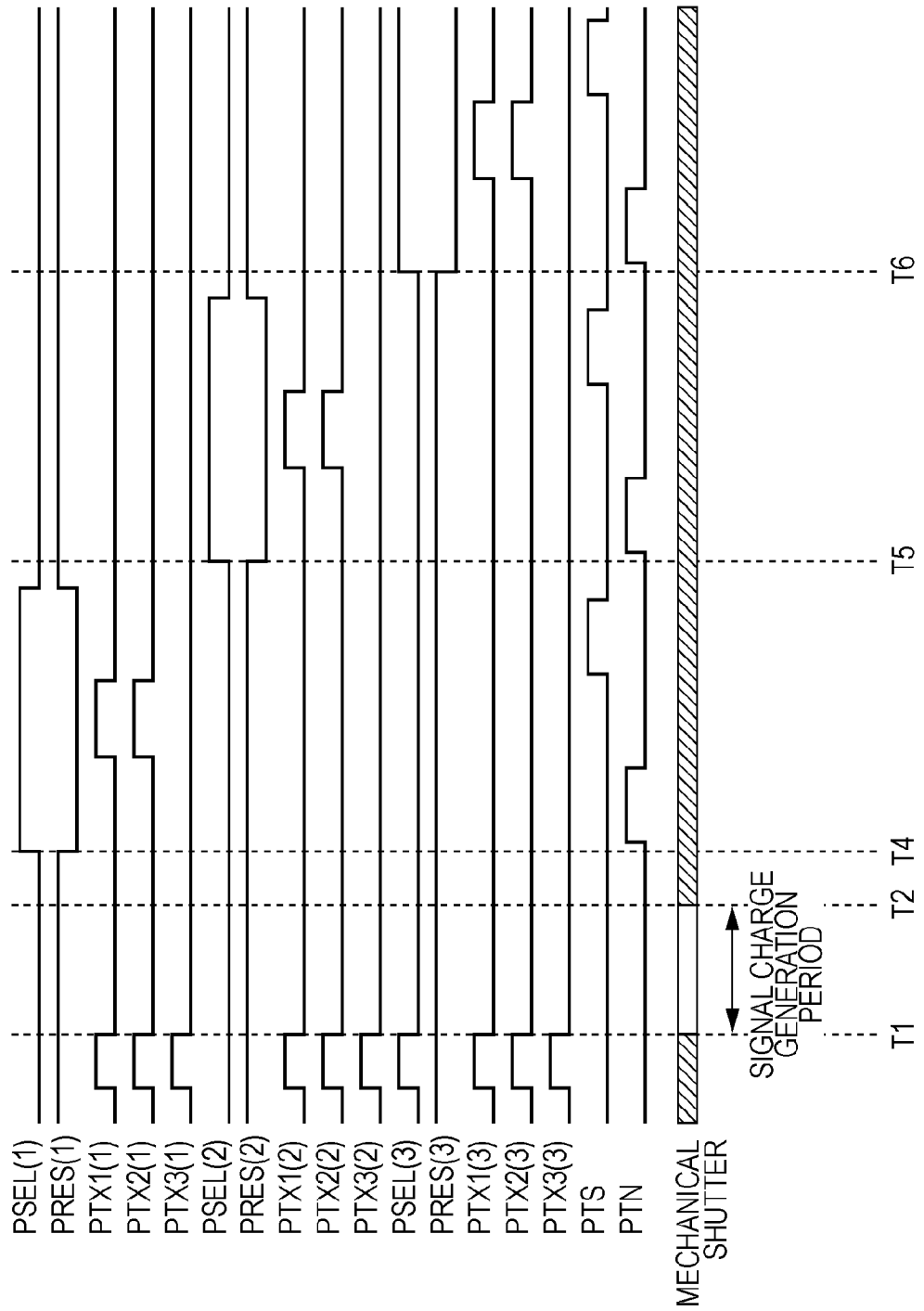

IMAGE PICKUP APPARATUS

BACKGROUND OF THE INVENTION

1. Field of the Invention

The present invention relates to an image pickup apparatus, and more particularly, to a technique to controlling an exposure time by using an electronic shutter in an image pickup apparatus.

2. Description of the Related Art

In an amplification-type image pickup apparatus such as that known as a CMOS image sensor, there are various known electronic shutter techniques to control starting and ending of accumulation of charges for all pixels over an entire image plane without using a mechanical method of blocking light.

In a technique associated with an electronic shutter disclosed in Japanese Patent Laid-Open No. 2006-246450, a charge generated in a photoelectric conversion part during an exposure period is transferred to a storage part, and, after the end of the exposure period, the photoelectric conversion part is reset to remove charges remaining in the photoelectric conversion part thereby achieving a function of the electronic shutter.

This technique is characterized in that functions are implemented separately by dedicated parts such that the photoelectric conversion part basically performs only photoelectric conversion and charge accumulation during the exposure period is performed by the charge storage part disposed adjacent to the photoelectric conversion part. Note that the charge storage part is disposed separately from the FD region. Because the saturation value of the number of charges in the photoelectric conversion part is small, transferring of charges from the photoelectric conversion part to the charge storage part can be performed using a low voltage. This device can be easily produced by a simple process based on a general CMOS production process, i.e., the production thereof is easier than CCD or other similar devices.

In the technique disclosed in Japanese Patent Laid-Open No. 2006-246450, the resetting of the photoelectric conversion part is performed after exposure is completed. In this technique, charges generated during the resetting period are not used effectively, and thus an improvement in this respect is sought. Furthermore, Japanese Patent Laid-Open No. 2006-246450 also discloses a technique to suppress dark electrons generated between the photoelectric conversion part and the charge storage part by using a buried channel transistor thereby achieving both surface pinning and electron transport during an exposure operation. However, in the buried channel structure, the height of the potential barrier is low compared with a surface channel transistor, and thus a further consideration is sought in terms of effective use of saturated charges in the charge storage part.

This is true not only for the buried channel structure but also for a structure in which an intermediate-level pulse is supplied to the photoelectric conversion part at a particular time in a period in which charges are accumulated in the photoelectric conversion part thereby transferring the charges to the charge storage part. In this case, a further consideration is desirable in terms of effective use of saturated charges in the photoelectric conversion part.

In view of the considerations described above, the present invention provides an image pickup apparatus that has a charge storage part provided separately from a photoelectric conversion part and an FD region in each pixel and that provides both a high speed shutter operation and an expanded large dynamic range.

SUMMARY OF THE INVENTION

The present invention provides an apparatus comprising pixels arranged in a form of a matrix, each pixel including a photoelectric conversion part, a charge storage part configured to store a signal charge received from the photoelectric conversion part, a charge discharging part configured to control conduction between the photoelectric conversion part and an overflow drain region, a transfer part configured to transfer the charge stored in the charge storage part, an amplifier part configured to amplify a signal based on the charge transferred by the transfer part, and a reset part configured to reset the photoelectric conversion part and the charge storage part, a shutter part configured to control the amount of light incident on the photoelectric conversion part, a scanning unit configured to supply a driving pulse to the transfer part, the reset part, and the charge discharging part, and a control unit configured to supply a control signal to the scanning unit to switch a driving mode between a first mode and a second mode, and supply a control signal to the shutter part, the first mode being performed such that the photoelectric conversion part and the charge storage part are released from a reset state for all pixels included in an image acquisition area to start a period, and, when a predetermined time has elapsed, the photoelectric conversion part and the overflow drain region of each pixel are turned onto end the period, and finally the stored charge is transferred to the amplifier part, the second mode being performed such that the shutter part is opened to start a period, and, when a predetermined time has elapsed, the shutter part is closed to end the period, and finally the stored charge is transferred to the amplifier part.

Further features of the present invention will become apparent from the following description of exemplary embodiments with reference to the attached drawings.

BRIEF DESCRIPTION OF THE DRAWINGS

FIG. 5 is a driving timing chart in a first mode according to an embodiment of the present invention.

FIG. 6 is a driving timing chart in a second mode according to an embodiment of the present invention.

FIG. 10 is a driving timing chart in a fourth mode according to an embodiment of the present invention.

DESCRIPTION OF THE EMBODIMENTS

Embodiments of the present invention are described in detail below with reference to the accompanying drawings.

Figure 1:
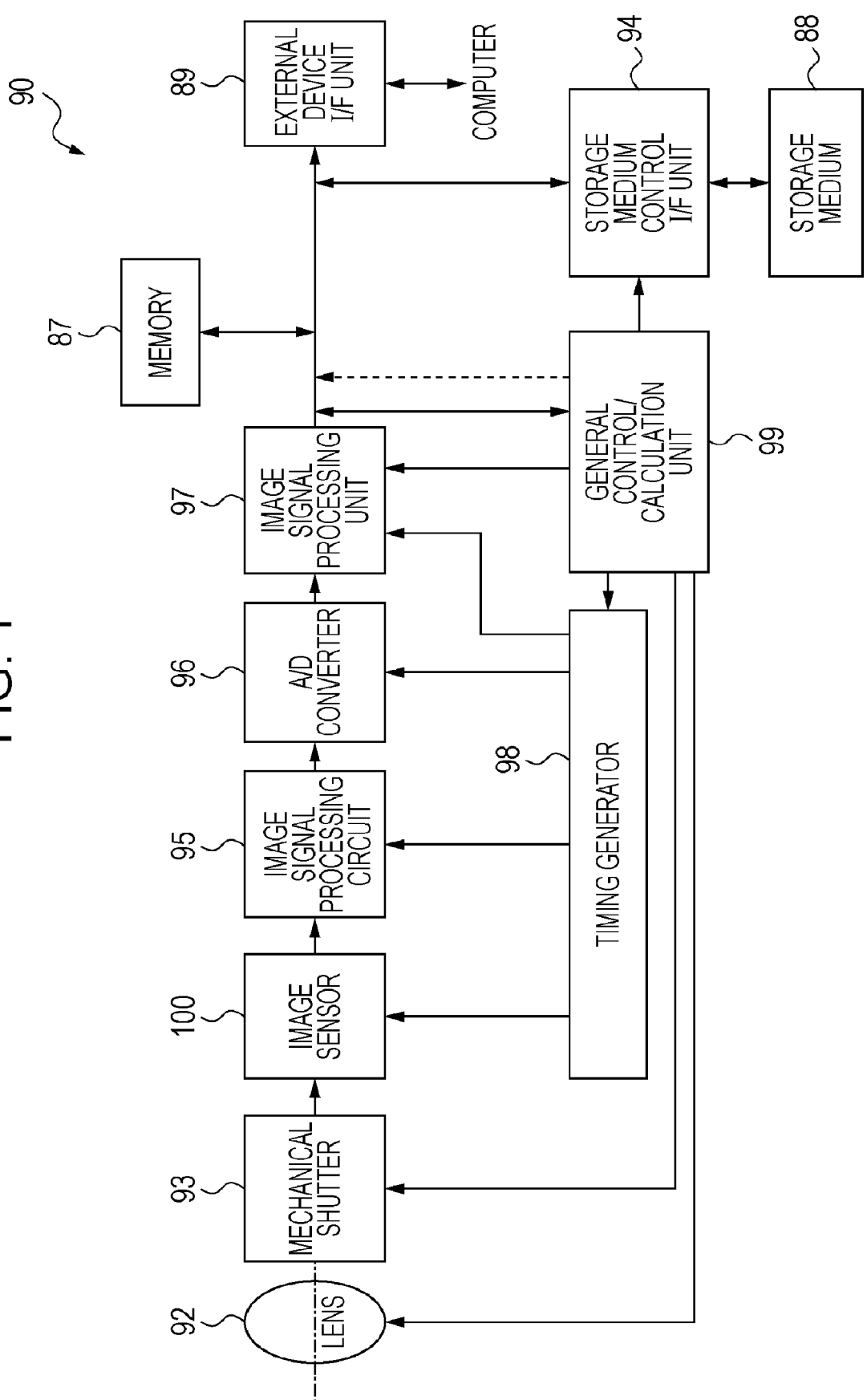
FIG. 1 is a block diagram illustrating an image pickup apparatus according to an embodiment of the present invention.

First, a configuration of an image pickup system 90 which is commonly applicable to all embodiments is explained with reference to FIG. 1. FIG. 1 is a block diagram illustrating the structure of the image pickup apparatus 90.

Main parts of the image pickup system 90 are an optical system, an image sensor 100 and a signal processing unit. The optical system mainly includes an imaging lens 92 and a mechanical shutter 93 configured to control the amount of light incident on a photoelectric conversion part. The signal processing unit mainly includes an image signal processing circuit 95 (first), an analog-to-digital (A/D) converter 96, an image signal processing unit 97 (second), a memory 87, an external device interface (I/F) unit 89, a timing generator 98, a general control/calculation unit 99, a storage medium 88 and a storage medium control/interface (I/F) unit 94. The signal processing unit may not include the storage medium 88.

The imaging lens 92 functions to refract incident light so as to form an image of a subject on a pixel array PA of the image sensor 100.

The mechanical shutter 93 is disposed in an optical path between the imaging lens 92 and the image sensor 100 to control the amount of light that is directed to the image sensor 100 after passing through the imaging lens 92. The mechanical shutter 93 has a first shutter curtain and a second shutter curtain each including a plurality of shutter blades. In the mechanical shutter 93, the first shutter curtain and the second shutter curtain are driven separately at different timings by the general control/calculation unit 99 thereby switching between an open state and a closed state. The image sensor 100 converts an image of a subject formed on the pixel array PA into an image signal. The pixel array PA includes pixels arranged in the form of a matrix. The image sensor 100 reads the image signal from the pixel array PA and outputs the read image signal. The image signal processing circuit 95 is connected to the image sensor 100 and is configured to process the image signal output from the image sensor 100.

The analog-to-digital converter 96 is connected to the image signal processing circuit 95 and is configured to convert the image signal (in an analog form) processed and output by the image signal processing circuit 95 into a digital signal.

The image signal processing unit 97 is connected to the analog-to-digital converter 96 and is configured to generate image data by performing various kinds of processing such as a correcting process on the image signal (in the digital form) output from the analog-to-digital converter 96. The resultant image data is supplied to, for example, the memory 87, the external device interface unit 89, the general control/calculation unit 99, the storage medium control/interface unit 94, etc.

The memory 87 is connected to the image signal processing unit 97 and is configured to store the image data output from the image signal processing unit 97.

The external device interface unit 89 is connected to the image signal processing unit 97 so that the image data output from the image signal processing unit 97 can be transferred to an external device (such as a personal computer) via the external device interface unit 89.

The timing generator 98 is connected to the image sensor 100, the image signal processing circuit 95, the analog-to-digital converter 96 and the image signal processing unit 97, and is configured to supply a timing signal to the image sensor 100, the image signal processing circuit 95, the analog-to-digital converter 96 and the image signal processing unit 97 such that the image sensor 100, the image signal processing circuit 95, the analog-to-digital converter 96 and the image signal processing unit 97 operate in synchronization with the timing signal.

The general control/calculation unit 99 is connected to the timing generator 98, the image signal processing unit 97, and the storage medium control/interface unit 94 and is configured to generally control the timing generator 98, the image signal processing unit 97, and the storage medium control/interface unit 94.

The storage medium 88 is removably connected to the storage medium control/interface unit 94 such that the image data output from the image signal processing unit 97 can be stored in the storage medium 88 via the storage medium control/interface unit 94.

The configuration described above allows a good image (image data) to be obtained if the image signal output from the image sensor 100 is good.

Figure 2:
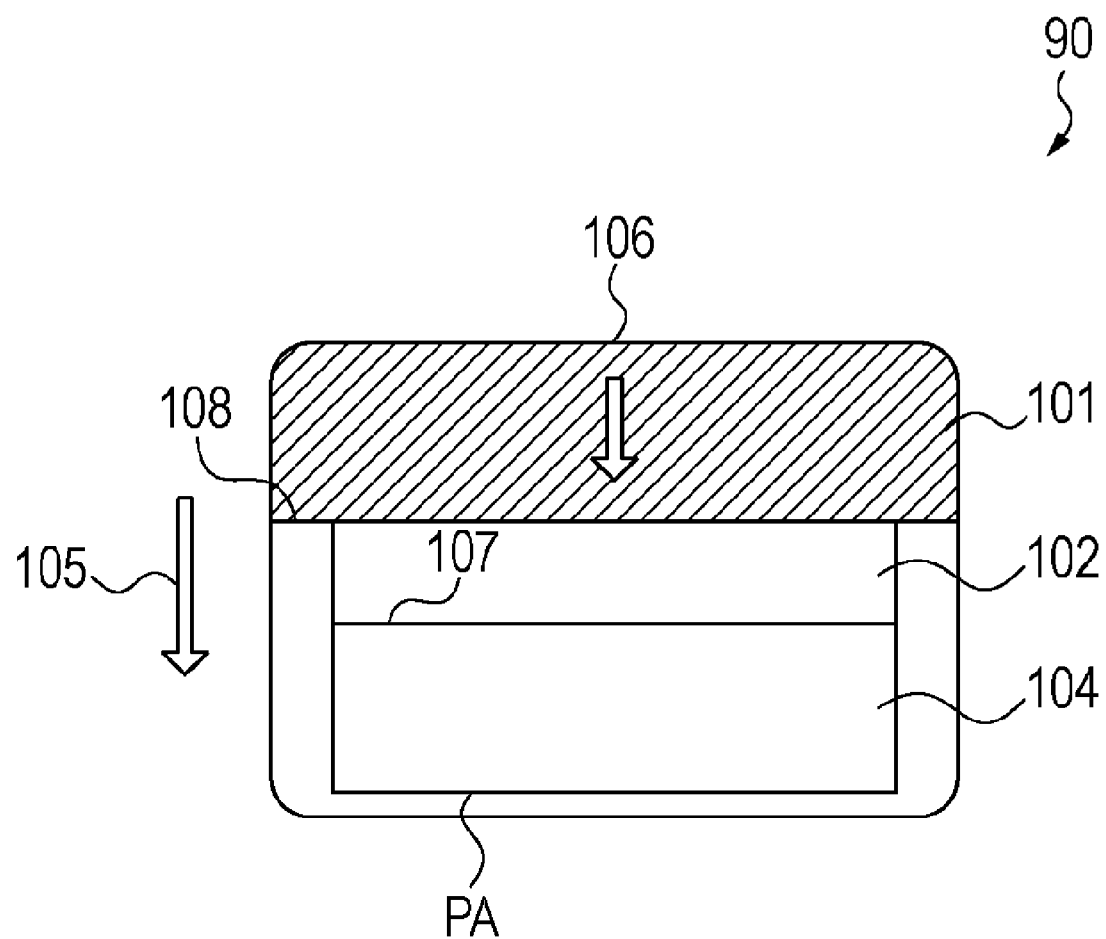
FIG. 2 is a diagram illustrating a manner in which light is blocked by a shutter in an image pickup apparatus according to an embodiment of the present invention.

Next, the operations of the image sensor 100 and the mechanical shutter 93 in the image pickup apparatus 90 are described below with reference to FIG. 2. FIG. 2 illustrates a manner in which the image sensor 100 and the mechanical shutter 93 are disposed.

In FIG. 2, a surface of the image sensor 100 is shown that faces the imaging lens 92, and also a second shutter curtain is shown that is a part of the mechanical shutter 93. As can be seen, the pixel array PA is disposed on the surface of the image sensor 100 facing the imaging lens 92. The pixel array PA has openings formed at locations corresponding to the photoelectric conversion parts of the respective pixels so that light can reach the pixels through the openings. In the example shown in FIG. 2, the mechanical shutter 93 is in a state in which a first shutter curtain (not shown) has completely traveled a full path from the top to the bottom leaving an opening behind, while a second shutter curtain 101 is in the middle of its travel from the top to the bottom and its leading end is currently at a position indicated by a reference numeral 108 whereby the pixel array PA is partially covered. That is, the mechanical shutter 93 operates such that the first shutter curtain and the second shutter curtain 101 travel in a direction from the top to the bottom of the case as shown by an arrow 106 in FIG. 2. 102 is an exposure region. 104 is a region where positioned under the region 102. The Region 104 is a region where electrical charges are drained by electrical shutter. 105 is a direction where the reading of a signal scanned by a scanning circuit is performed. 107 is a border of the region 102 and the region 104.

The mechanical shutter 93 controls the amount of light incident on the photoelectric conversion part in accordance with a control signal supplied from the general control/calculation unit 99 serving as the control unit.

Next, a configuration and an equivalent circuit of the image sensor of the image pickup apparatus according to the present invention are described below with reference to FIGS. 3 and 4. Similar parts to those in FIGS. 1 and 2 are denoted by similar reference numerals and a further detailed description thereof is omitted.

Figure 3:
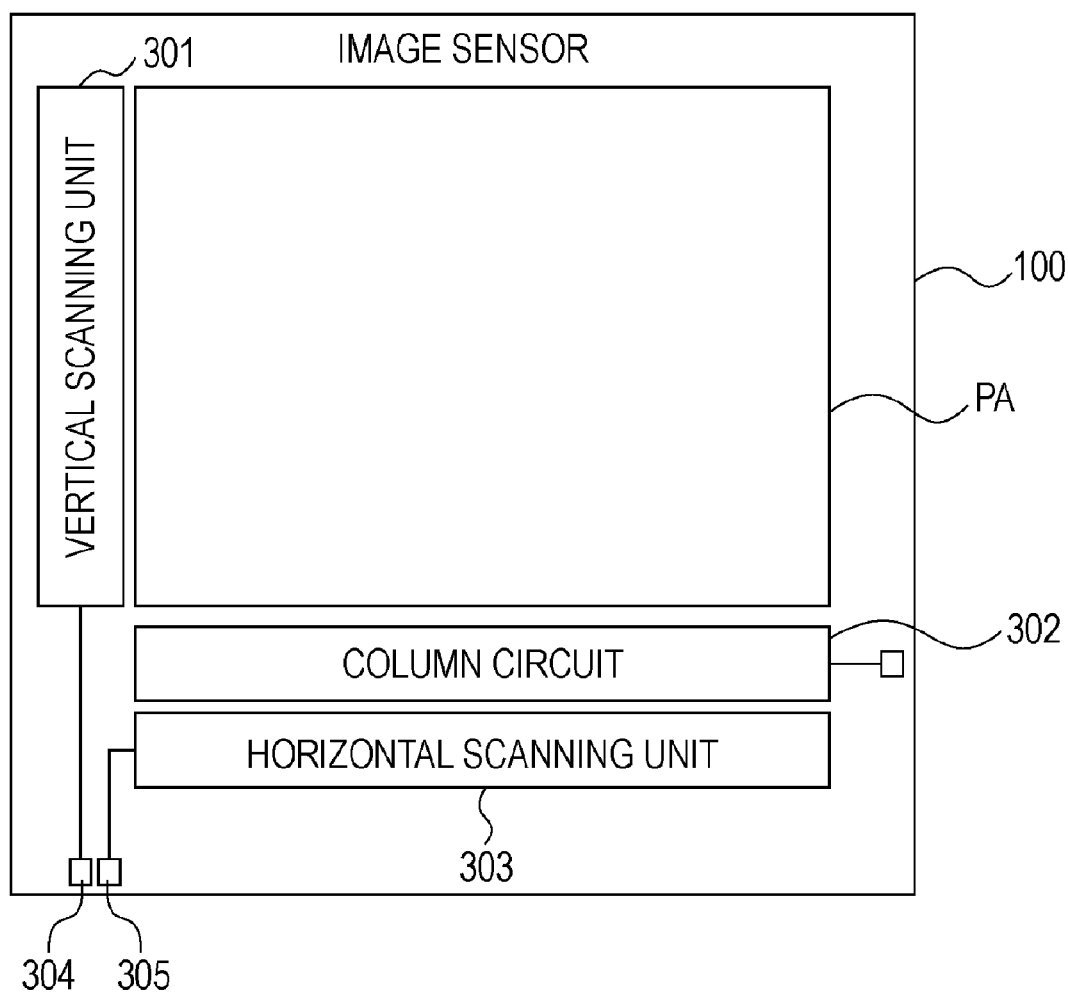
FIG. 3 is a bock diagram illustrating an image sensor according to an embodiment of the present invention.

In FIG. 3, the pixel array PA includes pixels arranged in the form of a matrix. Reference numeral 301 denotes a vertical scanning unit configured to scan pixels in the pixel array in units of one or more pixel rows. The vertical scanning unit 301 may be realized using a shift register or a decoder.

Reference numeral 302 denotes a column circuit configured to perform particular processing on a signal that is read from the pixel area PA via the scanning performed by the vertical scanning unit 301. The column circuit 302 may include, for example, a CDS circuit configured to reduce pixel noise, an amplifier configured to amplify a signal output from each pixel, an analog-to-digital converter configured to convert an analog signal received from each pixel into digital form, etc. When the column circuit 302 includes an analog-to-digital converter, the analog-to-digital converter 96 shown in FIG. 1 is not used.

Reference numeral 303 denotes a horizontal scanning unit configured to sequentially scan pixels in units of one or more pixel columns to read the signal processed by the column circuit. The horizontal scanning unit 303 may be constructed using a shift register or a decoder.

Reference numerals 304 and 305 respectively denote control terminals of the vertical scanning unit 301 and the horizontal scanning unit 303. Although each scanning unit has only one control terminal in this example, each scanning unit may have a plurality of control terminals depending on the function.

The vertical scanning unit 301 and the horizontal scanning unit 302 are capable of switching the driving mode of the image sensor 100 in accordance with a control signal received at the control terminal 304 or 305 from the control unit 99 via the timing generator 98. Although the control unit 99 is disposed separately from the image sensor 100 in this example, the control unit 99 may be disposed inside the image sensor 100.

There are interconnections by which to transmit an optical signal, a driving signal, and other signals between the constituent parts described above, although the interconnections are not shown in FIG. 3.

Figure 4:
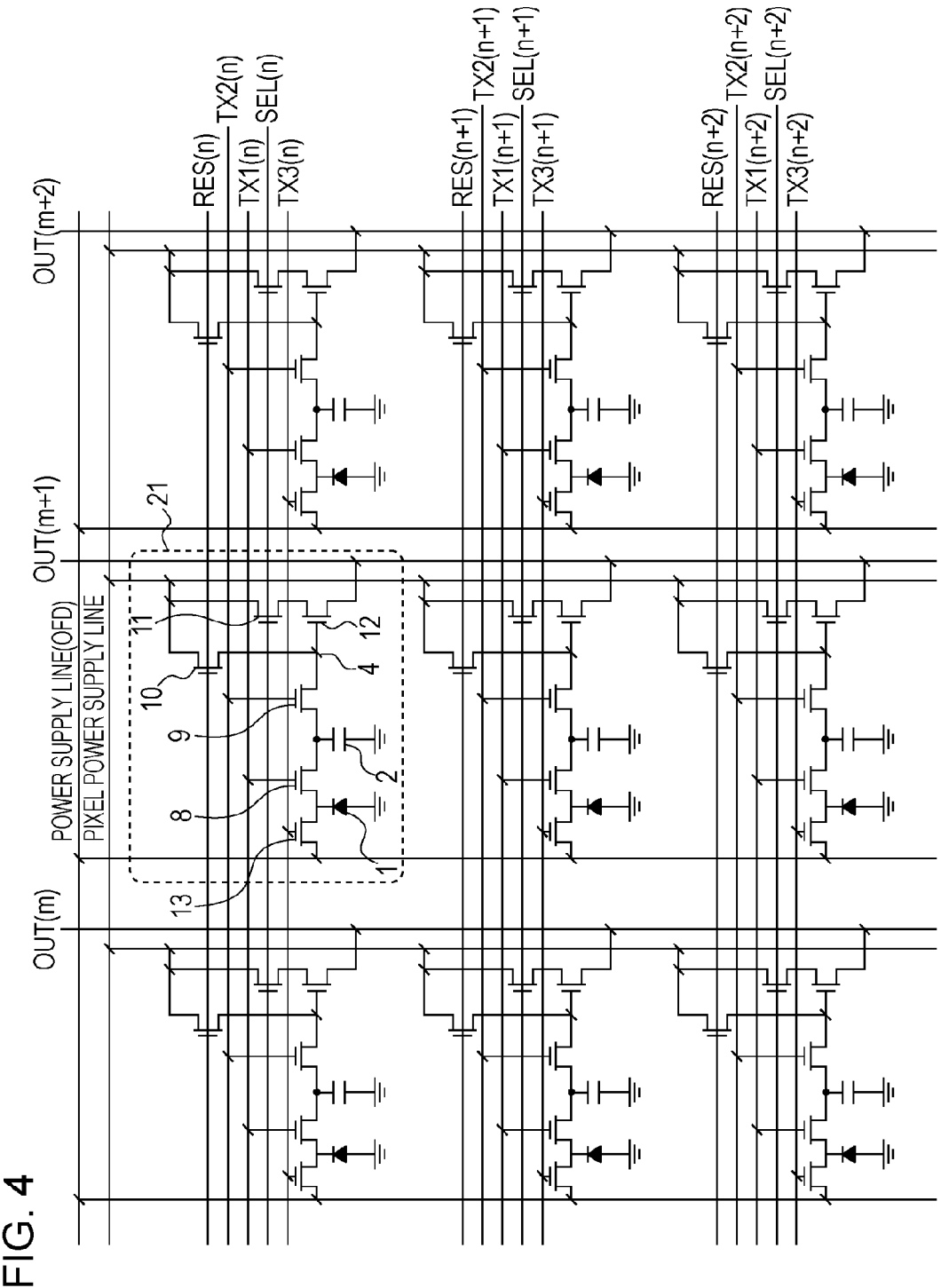
FIG. 4 is an equivalent circuit of an image sensor according to an embodiment of the present invention.

FIG. 4 illustrates an equivalent circuit 21 of pixels disposed in the pixel array PA. Although in the example shown in FIG. 4, for simplicity, the pixel array PA includes only 9 pixels arranged in the form of a 3×3 array, the number of pixels is not limited to this example.

Reference numeral 1 denotes a photodiode (PD) functioning as a photoelectric conversion part. An anode of the photodiode is connected to a fixed voltage level (for example, a ground level). A cathode of the photodiode is connected to one end of a charge storage part 2 via a first transfer switch 8 functioning as a first transfer part. The cathode is also connected to a power supply line, which is a second power supply serving as an overflow drain (OFD), via a third transfer switch 13 serving as the third transfer part. The third transfer switch functions as the charge discharging part that controls the conduction between the photoelectric conversion part and the OFD.

The other end of the charge storage part 2 is connected to a fixed voltage level (for example, the ground level). The above-described one end of the charge storage part 2 is also connected to a floating diffusion (FD) region 4 via a second transfer switch 9 functioning as the second transfer part. The FD region is connected to a gate electrode of an amplifying transistor 12 that is a part of the amplifier part. The gate of the amplifying transistor 12 functions as an input part of the amplifier part. The gate terminal of the amplifying transistor 12 is also connected to a pixel power supply line via a reset transistor 10 functioning as a reset part. Although in the example shown in FIG. 4, the power supply line serving as the OFD and the pixel power supply line are provided separately, these power supply lines may be connected to a common power supply or may be connected to different power supplies. The OFD region may be disposed at a location laterally adjacent to the photoelectric conversion part (LOFD (Lateral Over Flow Drain)) or at a location vertical adjacent to the photoelectric conversion part (VOFD (Vertical Over Flow Drain)).

Each transfer switch may be realized using a MOS transistor. Each transfer switch is controlled by a driving pulse supplied from the vertical scanning unit 301.

A selection transistor 11 functioning as a selection part is connected such that a drain electrode functioning as one main electrode is connected to the pixel power supply line, and a source electrode functioning as the other main electrode is connected to a drain, functioning as one main electrode, of the amplifying transistor 12. If a driving pulse is input to the selection transistor 11 thereby turning on the selection transistor 11, the amplifying transistor 12 forms a source follower circuit in conjunction with a constant current source (not shown) connected to a vertical signal line OUT, and a signal corresponding to a voltage of the gate electrode serving as a control electrode of the amplifying transistor 12 appears on the vertical signal line OUT. According to the signal appearing on the vertical signal line OUT, a signal is output from the solid state image pickup apparatus. The signal is passed through a signal processing circuit and other circuits elements whereby an image signal is obtained.

In the example shown in FIG. 4, each pixel includes a reset part, an amplifier part, and a selection part. Alternatively, a plurality of photoelectric conversion parts may share a reset part, an amplifier part, and a selection part. Without providing the selection part, each pixel may be selected by controlling the voltage of the input part of the amplifier part.

As described above, the present invention is applicable to a configuration in which a charge storage part is disposed between a photoelectric conversion part and an FD region.

In a specific embodiment, the present invention may be applied to a configuration in which a mechanism is provided in a charge path between the photoelectric conversion part and the charge storage part to allow the charges to be transferred from the photoelectric conversion part to the charge storage part in a state in which a low-level pulse is supplied to the first transfer part whereby the first transfer part is maintained in the off-state.

More specifically, for example, when the first transfer part is realized using a MOS transistor, the above-described mechanism may be achieved by constructing the MOS transistor in the form of a buried channel structure such that when the MOS transistor is in the off-state, there is a partially lowered part in a potential barrier formed at a depth below the surface. In this case, during a period in which the signal charge is accumulated, the charge transfer part may not perform an intentional control operation, but the charge transfer part may be maintained at a fixed voltage. That is, instead of providing the function of the transfer part, a fixed potential barrier may be formed. Immediately before the end of accumulation, the height of the potential barrier may be lowered so that the electrons remaining in the photoelectric conversion part are transferred to the charge storage part. Thereafter, the potential barrier is quickly returned to a height that does not allow electrons to pass.

In this configuration, when light is incident on the photoelectric conversion part, signal charges are generated via the photoelectric conversion and almost all generated signal charges are transferred to the charge storage part without being accumulated in the photoelectric conversion part. Therefore, it is possible to achieve the same charge accumulation period for all photoelectric conversion parts of the respective pixels. When a MOS transistor is in an off-state, holes are accumulated in a channel surface of the MOS transistor, wherein the channel through which charges are transferred is at a particular depth below the surface. This allows a reduction in influence of dark current at an interface of an insulating film.

In other words, during a period in which signal charges are accumulated in the photoelectric conversion part and the charge storage part, the potential barrier between the photoelectric conversion part and the charge storage part in the charge path is lower than the potential barrier between the photoelectric conversion part and the OFD region in the charge path. Note that the potential is herein defined with respect to the signal charge. In a specific implementation, the charge storage part may be realized using a charge couple device so that, during a period in which signal charges are accumulated in the charge storage part, a voltage is applied to an opposing electrode disposed via an insulating film so as to accumulate charges with a polarity opposite to that of the signal charges at the surface of the charge storage part. This can lead to a reduction in generation of dark electrons at a semiconductor surface in a region where the charge storage part is disposed.

Thus, the configuration described above allows a further reduction in a dark current associated with the charge storage part.

The driving operation is performed such that the signal charges transferred from the photoelectric conversion part to the charge storage part during one exposure period are held in the charge storage part and used as an image signal. In other words, after one exposure period is started in the photoelectric conversion part, the signal is read to the outside of the pixel without resetting the charge storage part. Note that one exposure period is determined in forming one frame of image such that the period is common for all photoelectric conversion parts.

Specific embodiments in terms of the configuration and the driving method according to the present invention are described below. In these specific embodiments described below, it is assumed that each pixel is configured such that the first transfer part is constructed using a buried channel MOS transistor, and the charge storage part is realized by a charge coupled device.

In a first embodiment, the image pickup apparatus has at least two operation modes, which are controlled by a control signal that is supplied from the control unit 99 shown in FIG. 1 at least to the vertical scanning unit 301 shown in FIG. 3 and by a control signal supplied to the horizontal scanning unit 302.

The first embodiment is described in detail with reference to FIGS. 5 and 6. FIG. 5 illustrates a timing chart in the first mode in which the exposure time is controlled by electrically controlling the drive of the image sensor without using the mechanical shutter 93. Hereinafter, this electronic mechanism will be referred to as an electronic shutter. FIG. 6 illustrates a timing chart in the second mode in which the exposure time is controlled using the mechanical shutter 93.

First, the control of exposure using the electronic shutter is described below with reference to FIG. 5. In this mode, because the mechanical shutter is not used in the control of the exposure time, there is no particular restriction on the operation of the mechanical shutter. Therefore, as shown in FIG. 5, the mechanical shutter may be maintained in an open state over a period including the exposure period. In alternative embodiment, in the electronic shutter operation mode, to eliminate effects of leakage of incident light after the completion of exposure thereby obtaining a high quality image, the mechanical shutter may be closed to block light as soon as possible after the completion of the exposure. To increase the speed of taking images in succession, the mechanical shutter may be maintained in an open state such that the exposure is not influenced by the status of the mechanical shutter, and the capturing of a next image can be started as soon as possible after the completion of capturing a previous image.

Hereinafter, for simplicity, first, second, and third transfer switches will be referred to as TX1, TX2, and TX3, respectively, and driving pulses applied thereto will be referred to as PTX1, PTX2, and PTX3, respectively. PTX1, PTX2, and PTX3 are turned on for a particular row at a particular time and are then simultaneously turned off at time T1 for pixels included in the image acquisition area. At this point of time, the photoelectric conversion part and the charge storage part of each of pixels included in the image acquisition area are released from the reset state and a signal charge generation period is started.

When a predetermined time has elapsed since then, PTX1 is turned on at time T2 thereby transferring charges remaining in the photoelectric conversion part to the charge storage part. At time T3, PTX3 is turned on simultaneously for all pixels of interest such that charges generated thereafter by photoelectric conversion are ejected into the overflow drain region. By this operation, the signal charge generation period is ended. In this state, although charges are generated in response to light incident on the photoelectric conversion part, the generated charges are ejected into the OFD region without being used in forming an image. Therefore, at this point of time, the signal charge generation period is ended.

Thereafter, PRES, PSEL, and PTX2 are controlled at T4, T5, and T6 for pixels in the image acquisition area on a row-by-row basis thereby line-sequentially transferring the charges in the charge storage part to the amplifier part.

Because the operation from the step of releasing from the reset state to the step of turning-on of PTX3 is electrically controlled, it is possible to control the operation at a very high speed in an order of microseconds.

When each pixel row is read, the reading may be performed while adding pixel values or pixel color values at adjacent locations.

Next, an explanation is given as to the exposure control in the mechanical shutter operation mode, i.e., the second operation mode.

First, PTX1 and PTX2 are turned off at time T1 to release the pixels from the reset state thereby bringing the pixels into a state in which signal charges generated by photoelectric conversion can be accumulated in the photoelectric conversion part and the charge storage part. In this process, because the signal charge generation period is determined by the mechanical shutter, the timing of turning off the PTX1 and PTX2 may be determined arbitrarily. In the present embodiment, the PTX1 and PTX2 are turned off at the same time, although the PTX1 and PTX2 may be turned off on a row-by-row basis. Immediately thereafter, the mechanical shutter is opened at T2 to start the signal charge generation period. If a predetermined period has elapsed, the mechanical shutter is closed at time T3 to end the signal charge generation period. To use the photoelectric conversion part and the charge storage part to hold the signal charges, PTX3 is maintained in the off-state over the all rows.

Thereafter, separately for each row, PSEL, PRES, PTX1, and PTX2 are properly controlled at times T4, T5, and T6 to sequentially transfer the charges in the photoelectric conversion part and the charge storage part to the amplifier part.

Next, the mechanism of the increase in the saturation value of the amount of charges in the mechanical shutter operation mode is described with reference to figures indicating potential profiles in a pixel for the electronic shutter operation mode (first operation mode) and the mechanical shutter operation mode (second operation mode).

PTS denotes a sampling pulse to capture a signal into a photo signal storage part in the column circuit. PTN denotes a sampling pulse to capture a signal into a noise signal storage part in the column circuit. The noise signal includes random noise and offset of a reset transistor of a pixel and an amplifying transistor. In a case where the column circuit includes an amplifier, the noise signal includes an offset of the column amplifier.

FIGS. 7A to 7H illustrate potential profiles in the mode in which the exposure is controlled by the electronic shutter. At time T1 in FIG. 5, the potential profile changes from that shown in FIG. 7A to that shown in FIG. 7B, and thus the reset state is released.

Figure 7A:
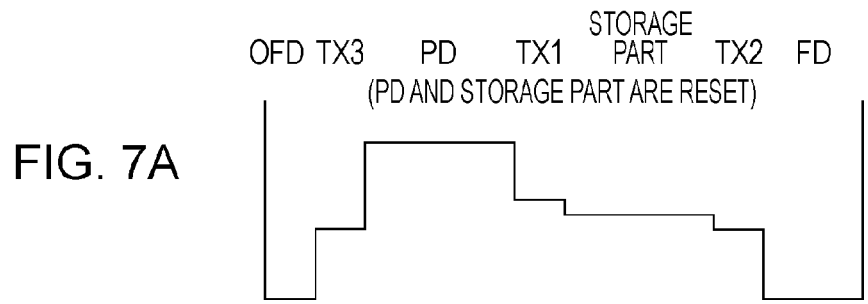
FIGS. 7A to 7H are diagrams illustrating potential profiles in the first mode.
Figure 7B:
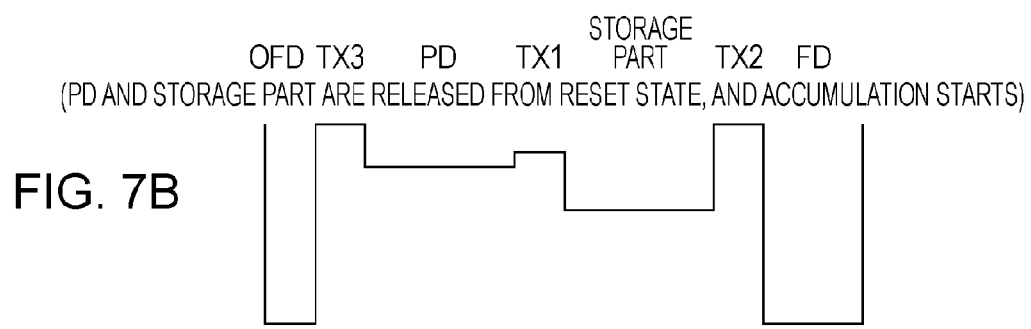
Figure 7C:
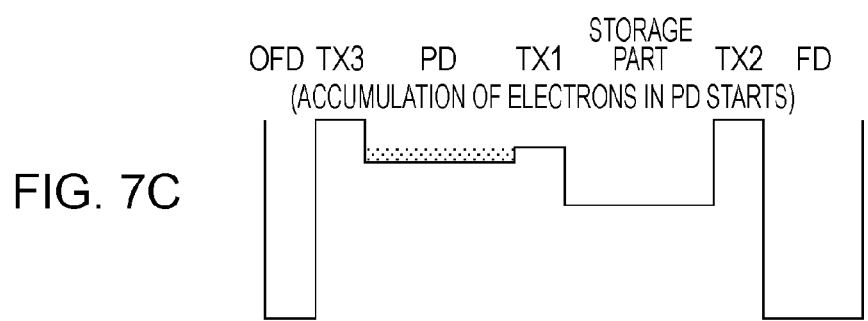
Figure 7D:
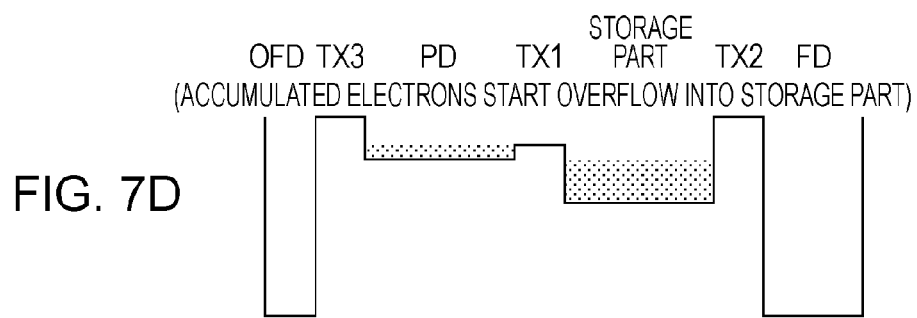

If the signal charge generation period is started at time T2, then as shown in FIG. 7C, accumulation of signal charges in the photoelectric conversion part starts. The charge storage part of each pixel is protected by an opaque film or the like from being exposed to light, and thus no signal charge is generated in the charge storage part except for charges due to leakage light. If a particular amount of signal charges has been accumulated in the photoelectric conversion part, then as shown in FIG. 7D, transport of the charges accumulated in the photoelectric conversion part toward the charge storage part starts, because the potential barrier against the charge storage part for the signal charges accumulated in the photoelectric conversion part is smallest among all parts. Thus, accumulation of the signal charges in the charge storage part starts.

Figure 7E:
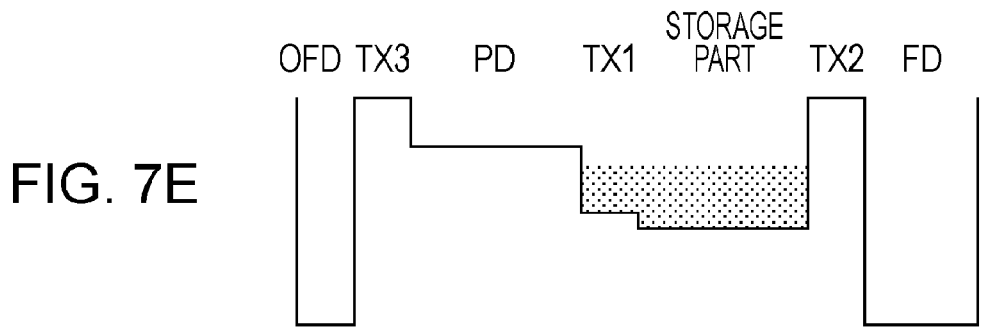

At time T2, the potential barrier created by TX1 is temporarily lowered so that the signal charges remaining in the photoelectric conversion part are completely transferred to the charge storage part as shown in FIG. 7E.

Figure 7F:
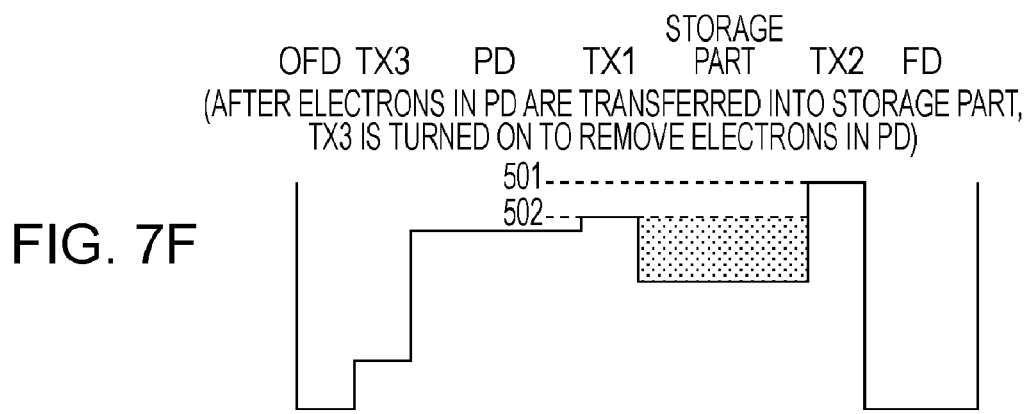
Figure 7G:
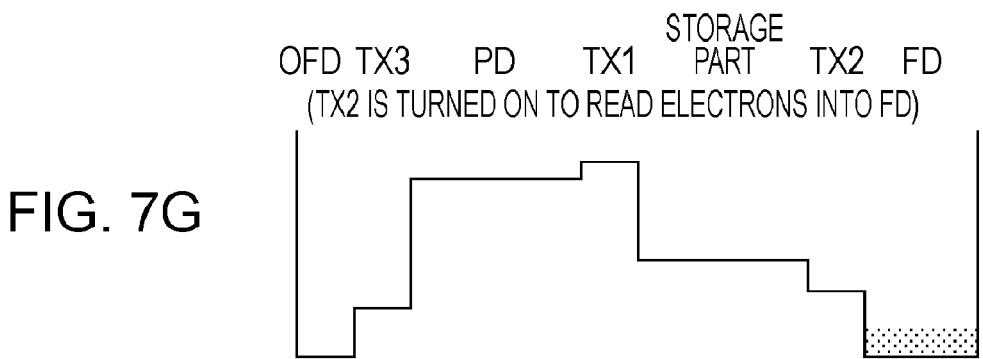
Figure 7H:
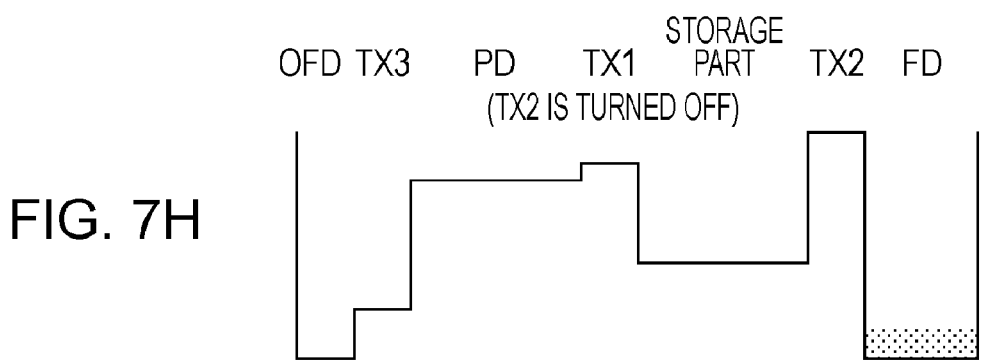

Thereafter, TX3 is turned on to obtain the potential profile shown in FIG. 7F. Charges generated by light that reaches the photoelectric conversion part thereafter are all ejected into the OFD region without being transferred to the charge storage part. Next, in a reading row, TX2 is turned on as shown in FIG. 7G and then turned off as shown in FIG. 7H thereby transferring the charges accumulated in the charge storage part to the amplifier part.

In a case where the potential barrier of TX1 is similar to that of a charge path created by other surface channel MOS transistors as shown in FIG. 7F, it is possible for the charge storage part to hold charges up to a height represented by a dashed line 501. However, in practice, because TX1 is a buried channel transistor, signal charges held beyond the height of the potential barrier of TX1 is ejected into the OFD region via the photoelectric conversion part, and thus a dashed line 502 is the upper limit of the amount of charges the charge storage part can hold.

Next, the mode in which exposure is controlled by the mechanical shutter is described. FIGS. 8A to 8G illustrate potential profiles in the mode in which exposure is controlled by the mechanical shutter. A horizontal solid band at the top of each figure indicates the state of the mechanical shutter. When a part of the band immediately above the photoelectric conversion part is open, the mechanical shutter is in an open state in which light can reach the photoelectric conversion part, while when the band is completely closed, the mechanical shutter is in a closed state in which light is blocked.

Figure 8A:
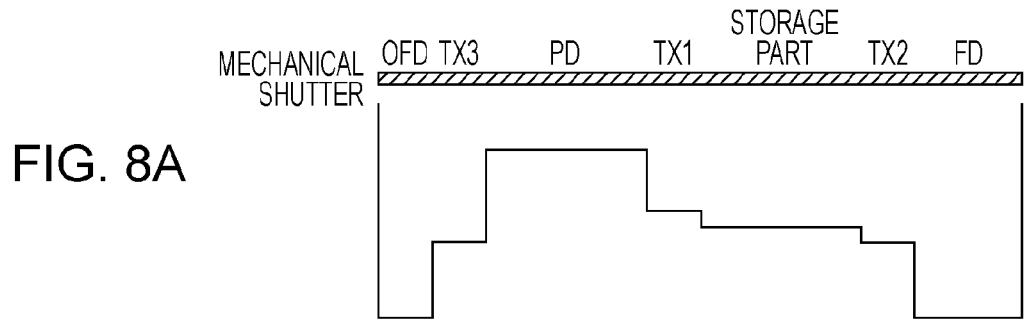
FIGS. 8A to 8G are diagrams illustrating potential profiles in the second mode.
Figure 8B:
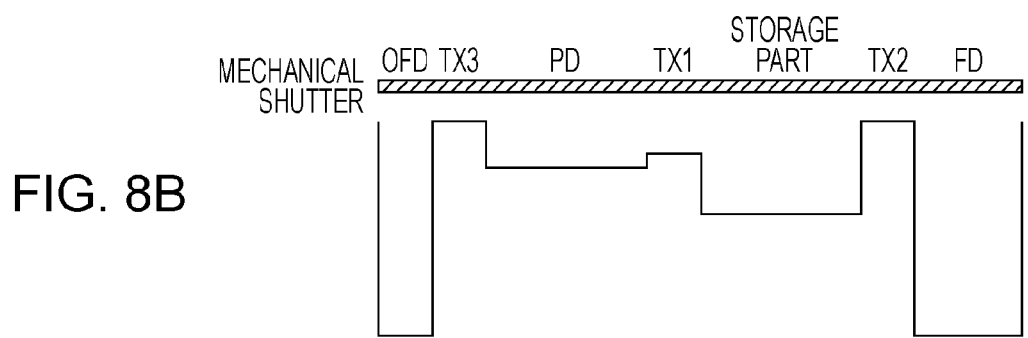
Figure 8C:
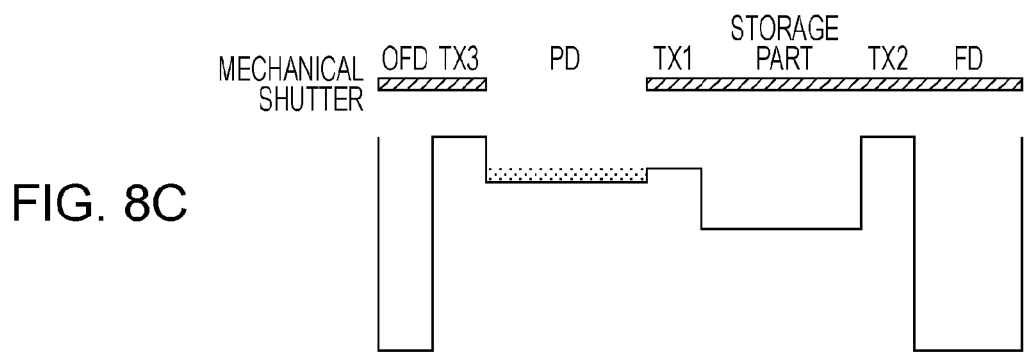
Figure 8D:
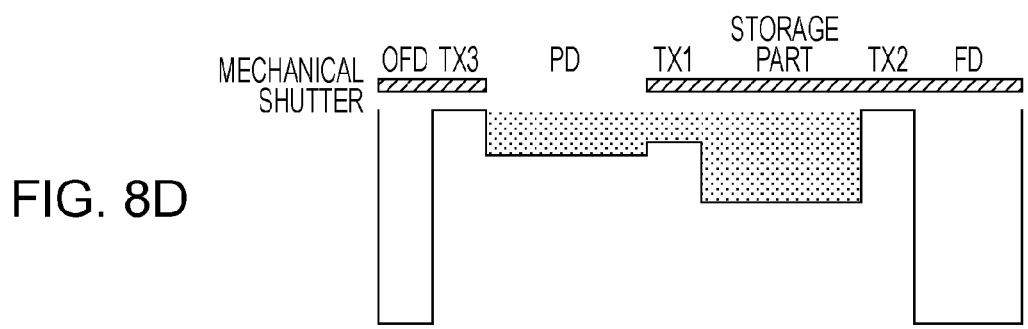

When the photoelectric conversion part is in a state in which light is blocked by the mechanical shutter, TX1, TX2, and TX3 are turned on while maintaining PRES in the on-state as shown in FIG. 8A thereby resetting the photoelectric conversion part and the charge storage part. At time T1 after that, the resetting operation is ended. As a result, a potential profile such as that shown in FIG. 8B is obtained. At time T2, the mechanical shutter is opened to start a signal charge generation period during which signal charges are generated by the photoelectric conversion part. In a state in which light with high intensity is incident on the photoelectric conversion part, the maximum number of charges that can be held is determined by the heights of the potential barriers of TX2 and TX3 regardless of the height of the potential barrier of TX1, as can be seen from FIG. 8D.

Figure 8E:
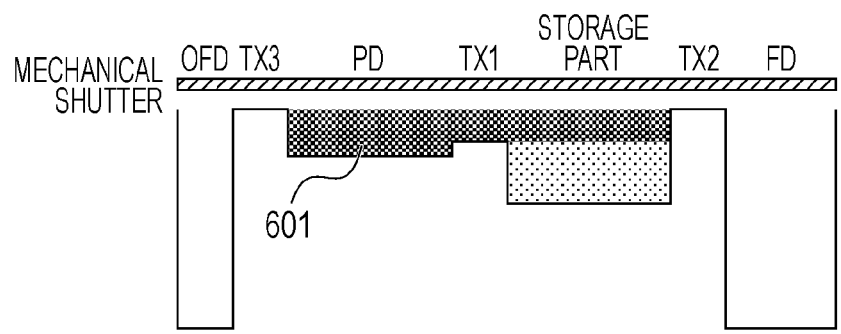
Figure 8F:
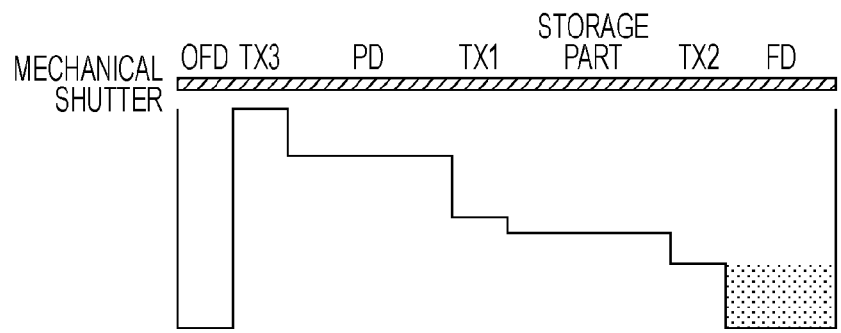
Figure 8G:
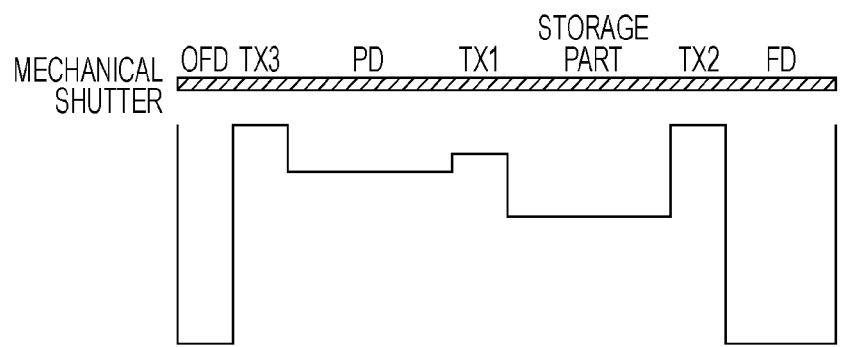

At time T3, as shown in FIG. 8E, the mechanical shutter is closed to prevent light from reaching the photoelectric conversion part. Thereafter, TX1 and TX2 are turned on while maintaining TX3 in the off-state thereby transferring the charges to the amplifier part as shown in FIGS. 8F and 8G.

In the above process, as can be seen from FIG. 8E, the maximum amount of accumulated signal charges is determined by the height of the potential barrier of TX3 (or TX1) and the potential depth of the charge storage part and the photoelectric conversion part. Because of the greater potential barrier compared with that in the electronic shutter operation mode shown in FIGS. 7A to 7H, each part has greater capacity of storing charges. Furthermore, in addition to the charge storage part, the photoelectric conversion part becomes capable of storing signal charges, and thus an increase is obtained in principle in the charge storage capacity corresponding to a shaded area 601 in FIG. 8E. Empirically, the charge storage capacity is increased by a factor of 1.3 to 1.5. This means that an image can be taken without having saturation for a subject with up to 1.5times higher luminance.

The present embodiment of the invention has the following features. In the electronic shutter operation mode, all controls are performed electrically, and thus very high speed exposure control is possible. Furthermore, preparation for a next operation of taking an image is also electrically made, and thus it is possible to realize a high speed shutter operation and achieve a function of taking a plurality of images in succession at a high speed. This is very useful, in particular, for taking images of a moving subject. On the other hand, in the mechanical shutter operation mode, charges can be stored using both the charge storage part and the photoelectric conversion part and thus it is possible to achieve a very high saturation value of the amount of charges. Note that single image pickup apparatus has two operation modes i.e., first and second operation modes that can be switchable, and thus the single image pickup apparatus is capable of taking an image with a very high speed shutter operation and taking a plurality of images in succession at a high speed in the first operation mode, and taking an image with a high saturation value of the amount of charges in the second operation mode. For example, the first operation mode may be used to take motion pictures, and the second operation mode may be used to take still images. The second operation mode may also be used in taking an image with an expanded dynamic range.

In the present embodiment, it is assumed that TX1 is realized using a buried channel MOS transistor. Alternatively, TX1 may be realized using a surface channel MOS transistor as with TX2 and TX3 and thus the height of the potential barrier may be similar to those of TX2 and TX3, because it is possible to effectively use the charge storage capacity of the photoelectric conversion part in the mechanical shutter operation mode although the charge storage capacity of the photoelectric conversion part is not used in the electronic shutter operation mode.

The saturation value of the amount of charges varies depending on the operation mode, and the variation in the saturation value can cause saturation to occur in the reading circuit. This situation can be avoided by providing a variable gain amplifier part in the reading circuit and switching the gain depending on the operation mode. In a case where the input dynamic range of the source follower provided in each pixel is not large enough, the capacitance of the floating diffusion of the pixel may be dynamically changed.

Figure 9:
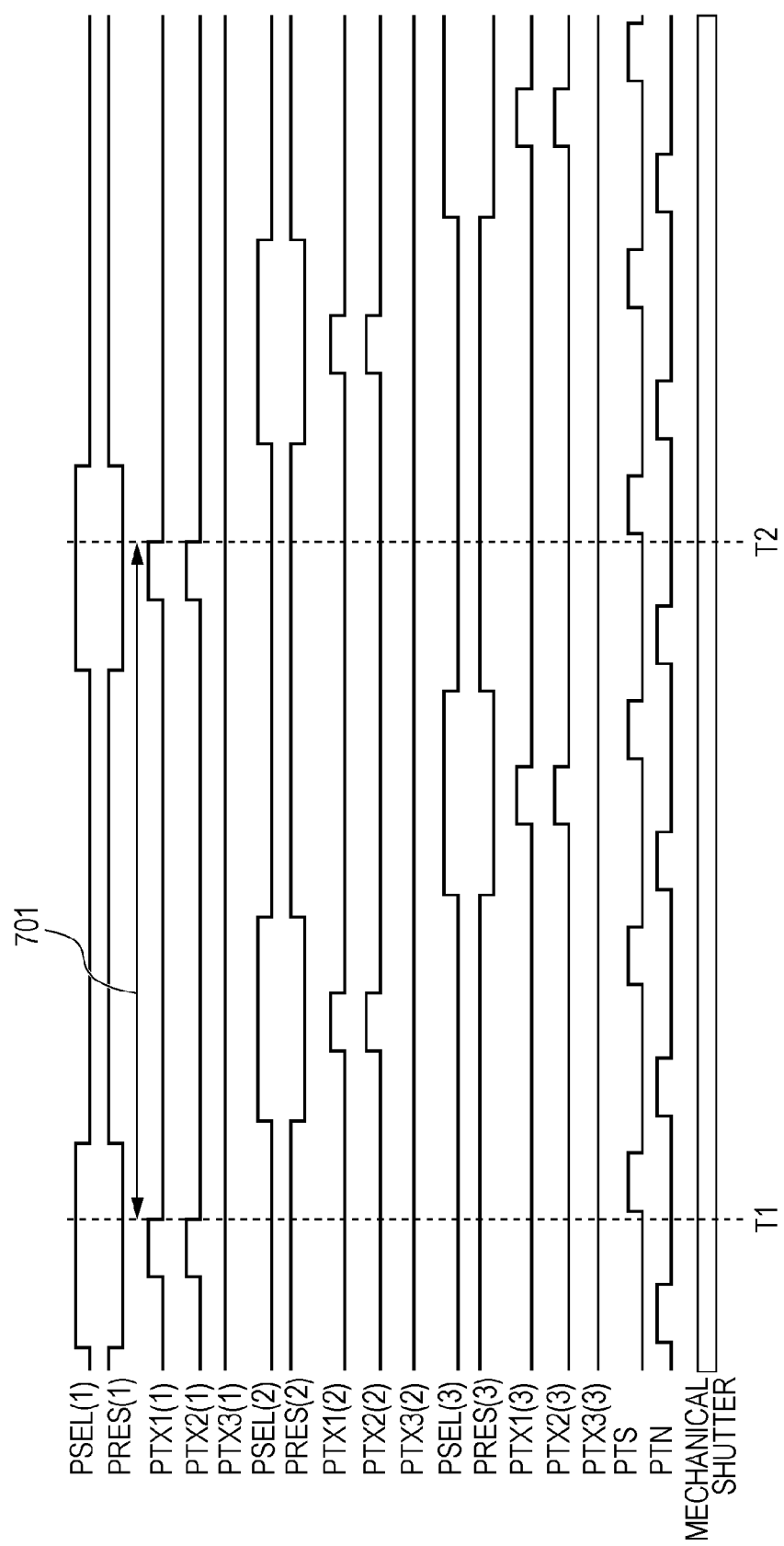
FIG. 9 is a driving timing chart in a third mode according to an embodiment of the present invention.

In a second embodiment, the image pickup apparatus has a third operation mode (line exposure mode) shown in FIG. 9 in addition to the two operation modes of the first embodiment described above. The third operation mode is explained below with reference to FIG. 9. The third operation mode may be specified by a control signal issued by the control unit 99 shown in FIG. 1.

In the line exposure mode (third operation mode), the operation is performed as follows. For the pixels in the image acquisition area, the photoelectric conversion part and the charge storage part are reset and then released from the reset state in units of pixel rows. If a predetermined period has elapsed, the signal charges in the charge storage part and the photoelectric conversion part are sequentially transferred to the amplifier part in units of pixel rows.

In the line exposure mode, the signal charge generation period is given by a time from the beginning of reading for each row to the beginning of a next row. For example, the signal charge generation period for the first row is given by a period 701 from time T1 to time T2. The reading time for a next row is adjusted in accordance with a row-to-row time difference in reading of a previous frame such that the signal charge generation period is equal to the period 701 for every row and thus the signal charge generation period is equal over the entire frame.

When the accumulation period is set to a value shorter than the period from the beginning of reading of a frame to that of a next frame, the photoelectric conversion part and the charge storage part may be reset for each row in the reading operation. In this case, the difference in reset time between rows may be adjusted to be equal to the difference in read time between rows.

Features inherent to the present embodiment of the invention are described below. In the electronic shutter operation mode, after exposure is completed, the photoelectric conversion part is to be reset before charges are read, and thus, in taking a motion image, there is a period during which exposure is not allowed. Existence of such a period in a motion image causes an image of a moving subject to be discontinuous in motion. In the mechanical shutter operation mode, it is difficult to take a motion image.

On the other hand, in the line exposure mode (third operation mode) according to the present embodiment, releasing from the reset state for each row is set to be equal or closely equal to the reading time of an image of a previous frame, and thus the non-exposure period can be substantially eliminated.

That is, taking a high quality motion image is possible and an electronic viewfinder is achieved in the third operation mode, in addition to the high speed shutter operation and the high speed successive capturing of images in the first operation mode and the high saturation value of the amount of charges in the second operation mode.

In a third embodiment, the image pickup apparatus has a fourth operation mode in which the start time of the signal charge generation period is electrically controlled while achieving a high saturation value of the amount of charges using the mechanical shutter. This makes it possible to quickly switch from a motion image capturing operation to a still image capturing operation. The fourth operation mode may be specified by a control signal issued by the control unit 99 shown in FIG. 1.

The operation according to the third embodiment is described below with reference to a timing chart shown in FIG. 10. The operation according to the third embodiment is different from the previous embodiments in that releasing from the reset state is performed at time T1 for all pixels included in the image acquisition area thereby starting the signal charge generation period, and the signal charge generation period is ended at time T2 in response to an operation of the mechanical shutter. More specifically, in a state in which light is incident on the photoelectric conversion part, the photoelectric conversion part and the charge storage part are reset and subsequently released from the reset state. Thereafter, the light path to the photoelectric conversion part is closed and the signal charges in the charge storage part and the photoelectric conversion part are sequentially transferred to the amplifier part in units of rows.

As for the mechanical shutter, for example, a lens shutter may be used that is capable of blocking light at the same time for all pixels. In a case where a mechanical shutter of a type that blocks light to the photoelectric conversion part for a period that differs for one row to another as with a focal plane shutter, data indicating the traveling speed of the shutter curtains may be stored in advance, and the timing of releasing the reset state may be adjusted according to the travelling speed of the shutter curtains so that the exposure time becomes equal for every row.

The fourth operation mode according to the present embodiment provides, in addition to the features obtained in the first and second embodiments, a feature that quick switching is possible from the line exposure mode that is used in operation of the electronic viewfinder or in taking a motion image to a still image mode using the mechanical shutter. It is also possible to quickly switch to an operation of taking an image using the mechanical shutter after a high speed operation of taking an image using the electronic shutter. It is possible to perform two operations in an extremely short time for capturing an image of a subject using a high speed shutter operation and for capturing an image of the same subject in a high saturation mode. This allows a user to select one of the two images.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-262999 filed Oct. 9, 2008, which is hereby incorporated by reference herein in its entirety.

What is claimed is:

1. An apparatus comprising:
   pixels arranged in the form of a matrix, each pixel including a photoelectric conversion part, a charge storage part configured to store a signal charge received from the photoelectric conversion part, a charge discharging part configured to control conduction between the photoelectric conversion part and an overflow drain region, a transfer part configured to transfer the charge stored in the charge storage part, an amplifier part configured to amplify a signal based on the charge transferred by the transfer part, and a reset part configured to reset the photoelectric conversion part and the charge storage part;
   a shutter part configured to control an amount of light incident on the photoelectric conversion part;
   a scanning unit configured to supply a driving pulse to the transfer part, the reset part, and the charge discharging part; and
   a control unit configured to supply a control signal to the scanning unit to switch a driving mode between a first mode and second mode, and supply a control signal to the shutter part, the first mode being performed such that the photoelectric conversion part and the charge storage part are released from a reset state for all pixels included in an image acquisition area to start a period, and, when a predetermined time has elapsed, the photoelectric conversion part and the overflow drain region of each pixel are turned on to end the period, and finally the stored charge is transferred to the amplifier part, the second mode being performed such that the shutter part is opened to start a period, and, when a predetermined time has elapsed, the shutter part is closed to end the period, and finally the stored charge is transferred to the amplifier part.

2. The apparatus according to claim 1, wherein the control unit is configured to switch the driving mode into a third mode in which for pixels included in the image acquisition area, the photoelectric conversion part and the charge storage part are reset and subsequently released from the reset state in units of pixel rows, and, when a predetermined time has elapsed, signal charges in the charge storage part and the photoelectric conversion part are sequentially transferred to the amplifier part in units of pixel rows.

3. The apparatus according to claim 1, wherein the control unit is configured to switch the driving mode into a fourth mode in which in a state in which light is incident on the photoelectric conversion part, the photoelectric conversion part and the charge storage part are reset and subsequently released from the reset state, and thereafter a light path to the photoelectric conversion part is closed, and signal charges in the charge storage part and the photoelectric conversion part are sequentially transferred to the amplifier part in units of pixel rows.

4. The apparatus according to claim 1, wherein a charge transferring path between the photoelectric conversion part and the charge storage part is provided by a channel buried MOS transistor.

5. The apparatus according to claim 1, wherein during a period in which signal charges are generated in the photoelectric conversion part and the charge storage part, a potential barrier, for the signal charges, in a charge path between the photoelectric conversion part and the overflow drain region is higher than a potential barrier, for the signal charges, in a charge path between the photoelectric conversion part and charge storage part.

* * * * *